F. F. STRATTON.
TREATMENT OF AIR FOR INTERNAL COMBUSTION ENGINE CARBURETERS.
APPLICATION FILED MAY 23, 1916.

1,387,021.

Patented Aug. 9, 1921.

Witness
Jas. E. Hutchinson

Inventor:
Fenton Frederick Stratton,
Bacon Milans
By
Atty's

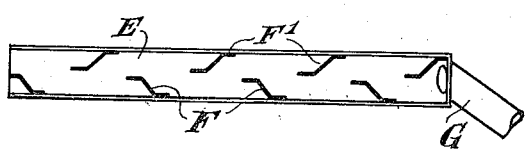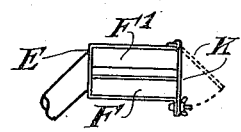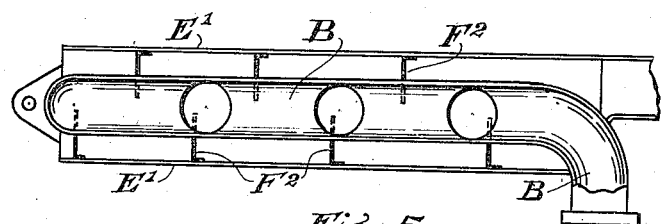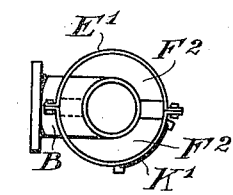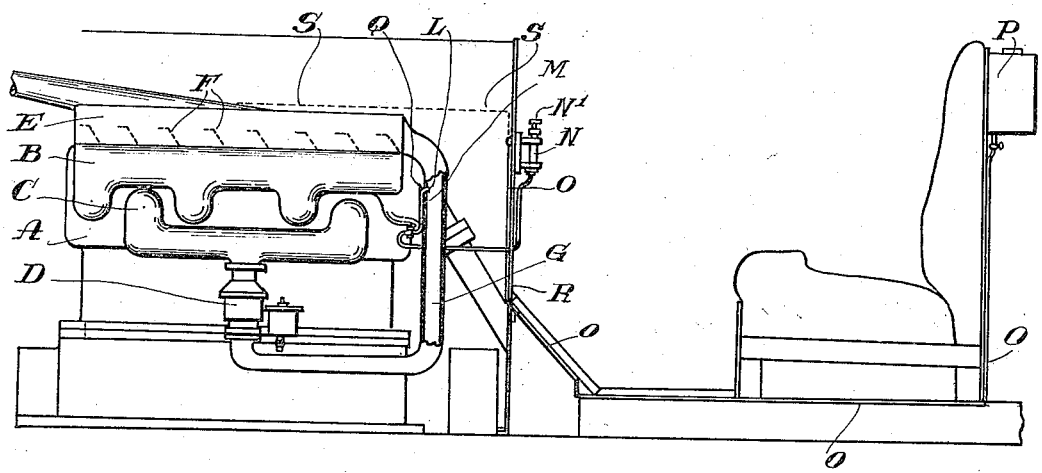

UNITED STATES PATENT OFFICE.

FENTON F. STRATTON, OF EAST CROYDON, ENGLAND.

TREATMENT OF AIR FOR INTERNAL-COMBUSTION-ENGINE CARBURETERS.

1,387,021.   Specification of Letters Patent.   Patented Aug. 9, 1921.

Application filed May 23, 1916. Serial No. 99,352.

*To all whom it may concern:*

Be it known that I, FENTON FREDERICK STRATTON, a subject of the King of Great Britain, and a resident of Oak Lodge, Park Hill Road, East Croydon, Surrey, England, have invented new and useful Improvements in and Relating to the Treatment of Air for Internal-Combustion-Engine Carbureters, of which the following is the specification.

This invention relates to improved means for heating and screening air for carbureters employed in motor vehicles and also to means for moistening or adding water vapor as required to the said heated air.

One object of this invention is to provide better means for heating the air supply to carbureters especially as used for motor engines, and thus prevent the freezing of the carbureter; the said means serving also to screen or sift the ingoing air so as to prevent the entry of grit or sand, which occasionally "sticks" an automatic valve in a carbureter and also injures valve seatings and cylinder walls.

A further object of this invention is to provide means whereby a small amount of water or water vapor may be added to the ingoing air to the carbureter. I have found in practice that considerable advantage is derived from adding, as it may be required, a little water vapor to the ingoing air to the carbureter, one advantageous result being a reduction in the deposit of carbon on the interior walls of the combustion chamber.

In order that my invention may be completely understood reference should be made to the appended sheet of drawings, some figures of which are to a large extent diagrammatic, and in which:—

Fig. 3 shows a modified form of the air heating casing shown in Fig. 1.

Fig. 4 is a transverse section of the apparatus shown in Fig. 3.

Fig. 5 is a further modification of the heating apparatus shown in Fig. 1.

Fig. 6 shows a transverse section of the apparatus shown in Fig. 5.

Fig. 7 shows the arrangement shown in Fig. 1, for heating and screening the ingoing air to the carbureter, with means for providing for the supply of a small quantity of water to the said heated air.

Figure 1:
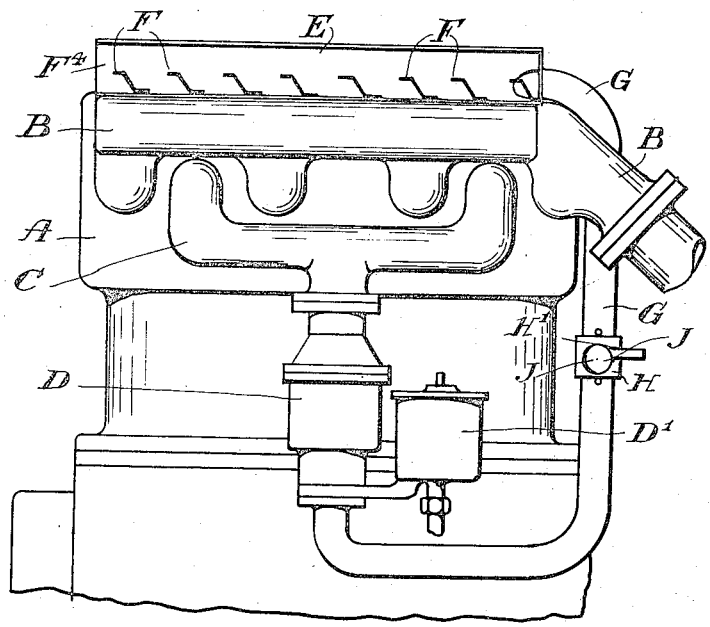
Figure 1 shows a side elevation of an internal combustion engine of the type employed for the propulsion of motor vehicles with the air heating apparatus constructed according to my invention, shown in part section.
Figure 2:
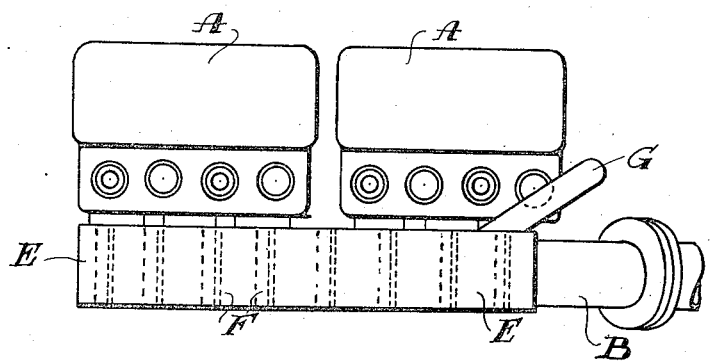
Fig. 2 is a plan of Fig. 1.

Referring to Figs. 1 and 2, A is an internal combustion engine of known type having an exhaust manifold B, and induction manifold C. D is a carbureter of standard design provided with a float chamber $D^1$. Situated adjacent to the said exhaust manifold B, and in contact therewith, I provide a rectangular casing E of suitable length and provided on the interior surface thereof with a plurality of ribs or webs F; these said webs are placed at suitable intervals apart and project upwardly from the interior lower surface of the said casing E. The webs F are inclined toward the incoming air which enters at the end $F^4$. The said webs or ribs F serve as baffle or screening plates for the ingoing air supply on its way to the carbureter D. The said webs, ribs or flanges in the preferred form of the invention as shown in Figs. 1, 3 and 7, are arranged with the edges or ends of same placed in line with or edgewise to the passing air, in order the better to intercept grit or particles carried by the air. By this means the air not only becomes heated by the adjacent exhaust pipe B, but the grit, sand, or dirt from the road is trapped in front of the webs or ribs F.

I provide the casing E with a hinged flap or cover K (see Fig. 4) on the side most convenient for access in order to be able to readily remove from time to time any grit or the like trapped by the said ribs F.

I provide at the rear end of the said casing, a pipe G, for conveying the heated and screened air from the said casing to the carbureter D, of suitable diameter, in order not to throttle the intake of air to the said carbureter.

The area of the passageway through the casing E is considerably greater, and it may with advantage be three times greater than the area of the passageway for air or mixture to the carbureter.

Rotatably surrounding the said pipe G, I provide a sleeve H of suitable dimensions, having a port J therein adapted to register with a similar port (not shown) in the wall of the pipe G. The said sleeve may be rotated about the pipe G by suitable links connected to the arm $H^1$ from the driver's seat of the vehicle, in order that the port J on the sleeve may be caused to uncover the port in the wall of the pipe G when it is desired to control or reduce the supply of heated air to the carbureter, or when extra air is required.

With reference to Figs. 3 and 4, these show a modified form of the heater shown in Figs. 1 and 2. In this modification a casing E similar to that before described is provided with a plurality of ribs or webs $F^1$ of preferably inclined form depending downwardly from the upper interior surface thereof. Similar webs or ribs F are provided projecting upwardly from the lower surface of the interior of the casing E and similarly spaced, each lower web being placed midway between two of the upper webs $F^1$.

Fig. 4 is a transverse section of the casing E shown in Fig. 3, showing the hinged cleaning flap K. By opening this flap as indicated in dotted lines, the interior of the casing E is readily accessible, and the grit or the like may be removed when desired. The said flap K is fastened or secured when closed by suitable means such as a flynut or the like.

With reference to Figs. 5 and 6, these show a further modification of the heating casing shown in the previous figures. In the example shown, the chamber or casing $E^1$ is of cylindrical form and surrounds the exhaust manifold B. It is provided with baffle ribs or webs $F^2$ alternately projecting and depending from the upper and lower interior surfaces of the casing $E^1$.

The function of the apparatus is similar to that before described with reference to Figs. 1 to 4.

The casing $E^1$ is provided with a sliding segment $K^1$ adapted to uncover a port in the said casing $E^1$ for cleaning purposes.

The casing E if desired, may be provided with a hinged shutter similar to that before described and shown in Fig. 4, but of segmental section.

Fig. 7 shows the before described heating and screening means together with means whereby a small quantity of water may be injected into the pre-heated air for the purpose of adding water vapor to the explosion mixture drawn into the combustion chamber of the engine. A is the engine, B the exhaust manifold, and E the casing of similar construction to that before described with reference to Fig. 1, the said casing or chamber E, is provided with an air pipe G, for conveying the heated and screened air from the said casing E, to the carbureter D. The said pipe G is provided at a suitable point in its length with a hole or port Q, into which is screwed a jet or nozzle L. This said jet L is connected to a small diameter pipe M, secured to the said pipe G, for a suitable distance along its length, the short length of pipe M is connected by suitable piping to the delivery cock of a drip sight feed device N of any suitable and known design capable of being adjusted to give any desired rate of flow, secured to the dash board R of the vehicle. This said drip feed device N is connected at its "intake" by suitable piping O to any desirable form of exterior reservoir such as tank P secured in the example shown to the back of the driver's seat or other suitable position.

The sight feed device N is provided with a screw-down needle adjusting valve $N^1$, in order that the rate of flow of the water from the injection jet or nozzle L, may be accurately varied as desired. By this means a small quantity of water is delivered to the pipe M, this pipe being in contact with the pipe G through which the heated air passes. The water delivered thereto is raised in temperature before being injected into the said ingoing air to the carbureter in order that it may be more readily caused to evaporate.

The jet nozzle L may be provided with a suitable pulverizing or spraying device similar in form to those employed in some carbureters, in order that the water may be injected into the heated air in the form of a cloud or spray which would more readily evaporate.

It will be obvious that when a separate water supply tank is used this said tank may be placed in any suitable position on the vehicle. For example, where this invention is used in connection with commercial vehicles it may be advantageous to place the said tank on the roof of the said vehicle.

In some cases it may be found desirable or necessary to place the tank at a lower level than the sight feed indicator, when means would be provided to maintain a constant pressure upon the upper surface of the liquid contained therein by any suitable means such as are provided in pressure fed petrol tanks.

It will be readily understood with reference to any of the forms of heating chambers or casings before described that the said casing may if desired be formed integrally with the exhaust manifold as one casting instead of being a separate unit.

I may prefer in an alternative arrangement to take the air supply from the front end of the heating and screening casing and to leave the rear end of the casing open to the air.

What I do claim as my invention and desire to secure by Letters Patent is:—

1. In a device of the character described, in combination with a conduit for the passage of a heating element, of a chamber disposed therearound for the admission of air to be heated by the element, said chamber being open at one end and having a connection at its opposite end with a carbureter, and a plurality of inclined baffles arranged within the chamber for screening the air prior to its admission to the carbureter.

2. In a device of the character described, the combination with a conduit for the passage of a heating element, of a chamber disposed therearound for the admission of air to be heated by the element, said chamber being open at one end and having a connection at its opposite end with a carbureter, and a plurality of staggeredly positioned inclined baffles arranged within the chamber for screening the air prior to its admission to the carbureter.

3. In a device of the character described, the combination with a conduit for the passage of a heating element, of a chamber disposed therearound for the admission of air to be heated by the element, said chamber being open at one end and having a connection at its opposite end with a carbureter, and a plurality of forwardly inclined baffles arranged within the chamber for screening the air prior to its admission to the carbureter.

4. In a device of the character described, the combination with a conduit for the passage of a heating element, of a chamber disposed therearound for the admission of air to be heated by the element, said chamber being open at one end and having a connection at its opposite end with a carbureter, and a plurality of inclined baffles having their end portions offset arranged within the chamber for screening the air prior to its admission to the carbureter.

5. In a device of the character described, the combination with a conduit for the passage of a heating element, and a chamber disposed therearound for the admission of air to be heated by the element, said chamber being open at one end and having a connection at its opposite end with a carbureter, and a plurality of inclined baffles having their end portions arranged parallel to the sides of the chamber and arranged within the same for screening the air prior to its admission to the carbureter.

6. In a device of the character described, the combination with a conduit for the passage of a heating element, of a chamber disposed therearound for the admission of air to be heated by the element, said chamber being open at one end and having a connection at its opposite end with the carbureter, means arranged within the chamber for screening the air prior to its admission to the carbureter, and a clean out opening arranged in the side of said chamber for removing the screened particles therefrom.

7. The combination with a conduit for the passage of a heating element, of an air chamber disposed around said conduit for the passage of air to be heated thereby, a connection between said air chamber and a carbureter, a moisture conducting pipe disposed for a portion of its length in direct contact with said connection and in communication therewith for admitting heated moisture to the heated air prior to its admission to the carbureter.

F. F. STRATTON.

Witnesses:
I. D. ROOTS,
L. POLIAKOFF.